United States Patent [19]

Bensimon et al.

[11] Patent Number: 5,533,125
[45] Date of Patent: Jul. 2, 1996

[54] REMOVABLE COMPUTER SECURITY DEVICE

[75] Inventors: Daniel Bensimon, Boca Raton; Neal A. Osborn, Delray Beach; Joaquin F. Pacheco, Boca Raton, all of Fla.

[73] Assignee: International Business Machines Corporation, Armonk, N.Y.

[21] Appl. No.: 503,536

[22] Filed: Jul. 18, 1995

Related U.S. Application Data

[63] Continuation of Ser. No. 397,017, Mar. 1, 1995, abandoned, which is a continuation of Ser. No. 43,425, Apr. 6, 1993, abandoned.

[51] Int. Cl.$^6$ .................................................. H04K 1/00
[52] U.S. Cl. .................................. 380/4; 380/23; 380/25
[58] Field of Search ........................... 380/3, 4, 23, 25, 380/49, 50; 235/379, 380, 382

[56] References Cited

U.S. PATENT DOCUMENTS

| | | | |
|---|---|---|---|
| 4,742,215 | 5/1988 | Daughters | 235/487 |
| 4,799,635 | 1/1989 | Nakagawa | 380/4 X |
| 4,816,653 | 3/1989 | Anderl et al. | 235/380 |
| 4,864,542 | 9/1989 | Oshima et al. | 365/189.01 |
| 4,882,474 | 11/1989 | Anderl et al. | 235/380 |
| 4,910,774 | 3/1990 | Barakat | 380/23 |
| 4,932,053 | 6/1990 | Fruhauf et al. | 380/4 |
| 4,947,318 | 8/1990 | Mineo | 364/200 |
| 5,012,514 | 4/1991 | Renton | 380/4 |
| 5,034,597 | 7/1991 | Atsumi et al. | 235/380 |
| 5,048,085 | 9/1991 | Abraham et al. | 380/23 |
| 5,065,429 | 11/1991 | Lang | 380/25 |
| 5,115,508 | 5/1992 | Hatta | 380/4 X |
| 5,120,939 | 6/1992 | Claus et al. | 235/382 |
| 5,131,091 | 7/1992 | Mizuta | 395/725 |
| 5,146,499 | 9/1992 | Geoffrotin | 380/23 |
| 5,282,247 | 1/1994 | Mclean et al. | 380/4 |

*Primary Examiner*—David C. Cain

[57] ABSTRACT

An intelligent removable information storage device (100), for coupling to a host microcomputer system (10), includes a local processor unit (106) including apparatus for preventing the microcomputer system from reading from, or writing to, the storage device absent the entry of an appropriate password by a user of the host microcomputer system. The storage device also includes a storage medium (e.g., a magnetic disk) for storing information including at least one password. The local processor unit includes apparatus for preventing access to the information stored in the storage means absent receipt of a valid password.

10 Claims, 5 Drawing Sheets

REMOVABLE COMPUTER SECURITY DEVICE

This is a continuation of application Ser. No. 08/397,017, filed Mar. 1, 1995, now abandoned which is a continuation of application Ser. No. 08/043,425, filed on Apr. 6, 1993, now abandoned.

BACKGROUND OF THE INVENTION

This invention relates generally to removable peripheral devices for microcomputers, and more specifically to removable device security removable peripheral devices for personal computers.

Personal computer systems in general and IBM personal computers in particular have attained widespread use for providing computer power to many segments of today's modern society. Personal computer systems can usually be defined as a desk top, floor standing, or portable microcomputers that consist of a system unit having a single system processor and associated volatile and non-volatile memory, a display monitor, a keyboard, one or more diskette drives, a fixed disk storage, and an optional printer. One of the distinguishing characteristics of these systems is the use of a motherboard, or system planar, to electrically connect these components together. These systems are designed primarily to give independent computing capability to a single user and are inexpensively priced for purchase by individuals or small businesses. Examples of such personal computer systems are IBM's PERSONAL COMPUTER XT and AT and IBM's PERSONAL SYSTEM/2 Models 25, 30, 35, 40, 50, 55, 56, 57, 60, 65, 70, 80, 90, and 95.

These systems can be classified into two general families. The first family, usually referred to as Family I Models, use a bus architecture exemplified by the IBM PERSONAL COMPUTER AT (AT is a trademark of the IBM corporation) and other "IBM compatible" machines. The second family, referred to as Family II Models, use IBM's MICRO CHANNEL bus architecture exemplified by IBM's PERSONAL SYSTEM/2 Models 50 through 95. Certain Family I and most Family II models typically use the high speed INTEL 80386, and 80486 microprocessors.

Such personal computers are characterized as having an "open" architecture. That is, the systems are designed and constructed in such a way that additional peripheral devices, such as removable media direct access storage devices (or DASD) that may be selected and added to the systems, or an existing device that may be changed for a device of a different type. The floppy disk drives mentioned above are one example of a removable media DASD.

Family II machines may have DASD using 3.5 inch diskettes to store 720 kilobytes or 1.44 megabytes or 2.88 megabytes of data. It is known and contemplated that other removable media DASD may be provided and may be used in or with personal computers of the general types described.

One such information storage device is the so-called personal computer card (or simply, pc card) made in accordance with the standard established by the Personal Computer Memory Card International Association (PCMCIA). All pc cards have the footprint of a credit card. These pc cards may be classified under two general categories: memory cards and input/output (I/O) cards. Memory cards were the first generation of cards specified by Release 1.0 of the PCMCIA standard. These cards are file-formatted and are used in substantially the same way as memory diskettes. I/O cards are specified in Release 2.0 of the standard. These types of cards include modems, local area networks (LANs), image cards, hard disk drives, faxes, and docking stations. There are three physical sizes for these cards. All three types are 54.0 mm in length, and 54.0 mm in width. Type I are 3.3 mm in thickness; Type II are 5.0 mm; and Type III, 10.5 mm. The PCMCIA standard is becoming widely used for connecting peripheral devices to portable and notebook personal computers and may be used for other types of pcs.

Protection from unauthorized users may be required in cases where confidential or classified information is handled by automated information systems, such as personal computer systems. The need for security becomes acute in systems using small removable information storage devices, such as pc cards, because of their value. There are two sources of value in these storage devices: (1) the intrinsic value of the device itself (DASD can represent up to one-third the value of the hardware cost of the system); and (2) the data contained in the device may itself be more valuable than the device. Previously, small removable memory devices (e.g., diskettes and CD ROMs) typically used physical means of security such a write-prevent tabs or switches and locks. Moreover, access to a computer system may require the use of a password. However, in the cases of small removable storage devices these security measures may be inadequate because of the attractiveness for theft of these devices. A thief of a small removable device could have read the information in the medium in a system not requiring a password and could also re-use the storage device itself. Additionally, in prior systems a password string was transferred to the host computer to enable password protection in a blind "set password function." Consider a device that does not have password protection enabled. It may have never been enabled, or the operator may have disabled it via the proper input of the required password(s). A malicious user or a virus software program could create and enable a new password without the permission of a legitimate operator, the drive becomes password protected and unusable, even to a legitimate user. This can be a problem where the user did not intend the system to be password protected. Thus, a need exists for better security measures.

SUMMARY OF THE INVENTION

Briefly, in accordance with the invention, a removable information storage device includes means for preventing the computer system from reading from, or writing to, the storage device absent the entry of a selected password by a user of the host computer system.

BRIEF DESCRIPTION OF THE DRAWING(S)

DESCRIPTION OF THE ILLUSTRATIVE EMBODIMENT(S)

Figure 1:
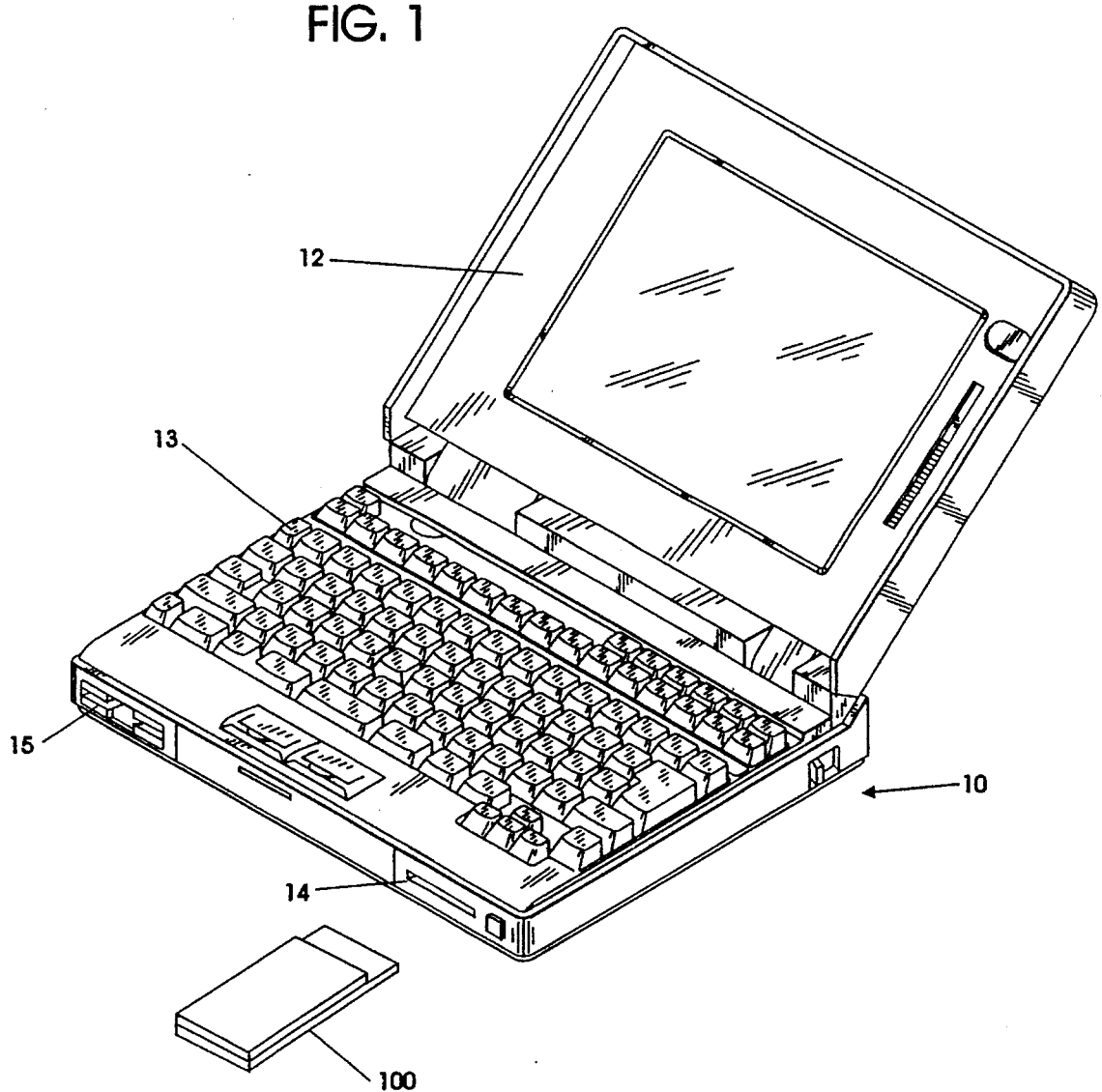
FIG. 1 is a perspective view of a personal computer system embodying this invention.

Referring to FIG. 1, a microcomputer system 10, embodying the present invention is shown and generally indicated. The computer system 10 includes a monitor 12 and a keyboard 13. The computer system 10 also includes removable media direct access storage devices (DASDs) which are preferably a floppy disk drive 15 and a slot 14 for a personal computer card (or, simply, a pc card). The pc card is preferably one complying with the PCMCIA standard. In accordance with the invention, removable DASDs having processor means would include a password security feature that would prevent the unauthorized access to the information stored in these devices and the use of the devices themselves.

Figure 2A:
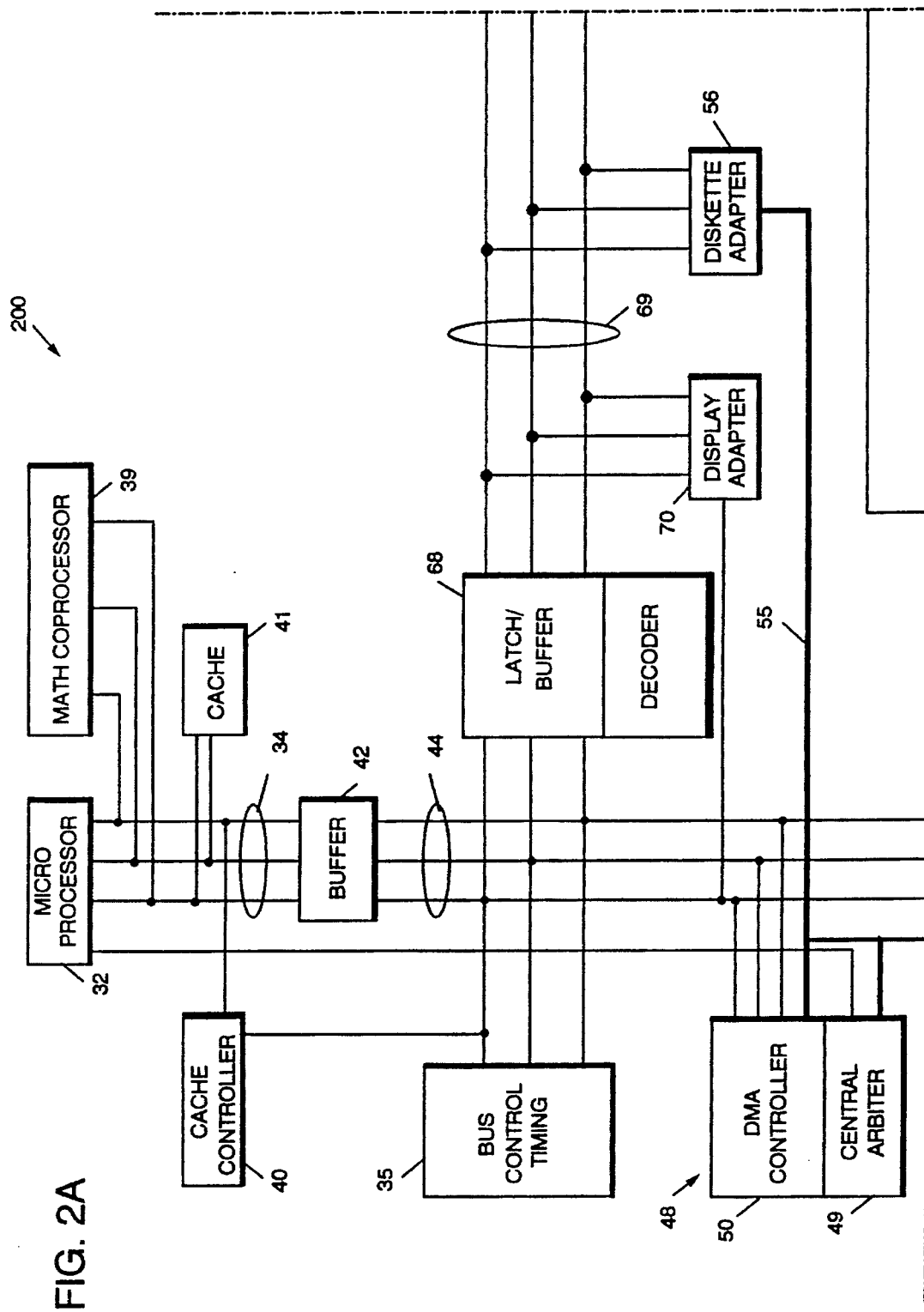
FIG. 2 is a block diagram of certain components of the personal computer of FIG. 1.
Figure 2B:
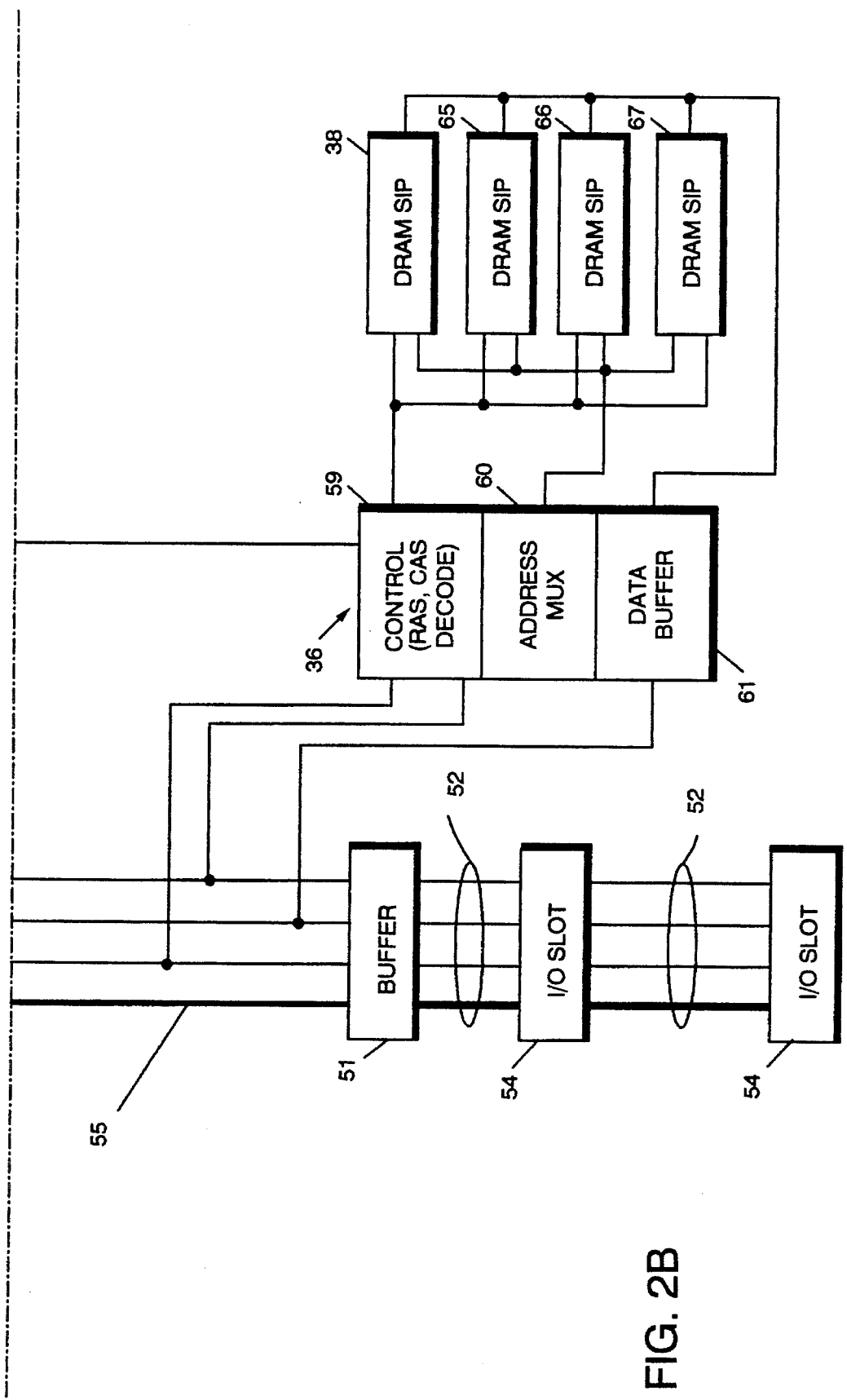
Figure 2C:
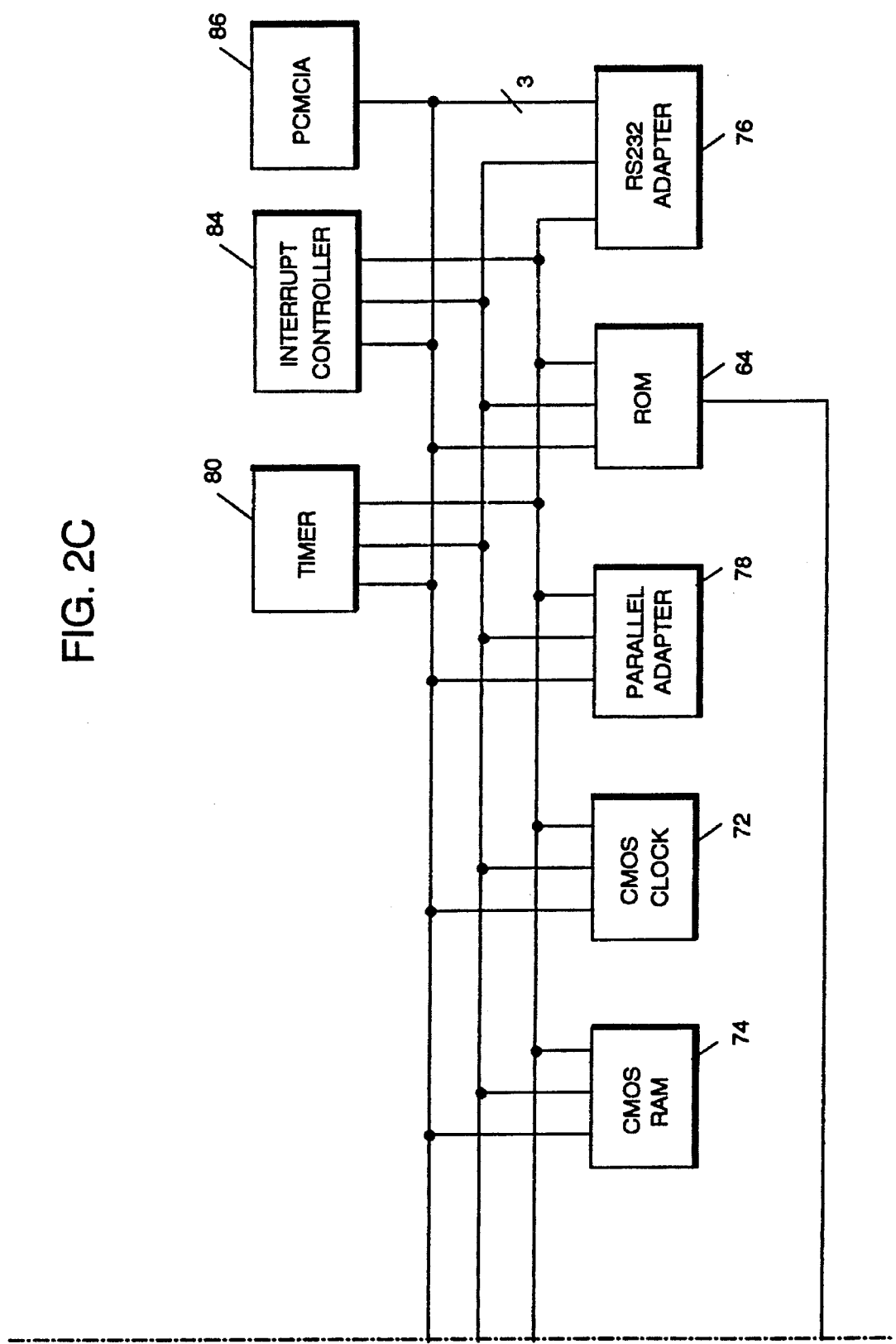

Referring to FIG. 2, there is shown a block diagram of a personal computer system illustrating the various components of the computer unit 11 of FIG. 1. The computer 10 includes a motherboard (or planar) having components mounted thereon. Also connected to the planar is the system processor 32, which comprises a microprocessor, connected by a high speed central processing unit (CPU) local bus 34, through a bus control timing unit 35, to a memory control unit 36 which is further connected to a volatile random access memory (RAM) 38. While any appropriate microprocessor can be used, one suitable microprocessor is the 80486 which is sold by Intel Corp.

The CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer (or latch/buffer) 68. The system bus 44 is further connected to the bus control timing unit 35 and a direct memory access (DMA) unit 48. The DMA unit 48 comprises a central arbitration unit 49 and DMA controller 50. A buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is the memory control unit 36 which comprises a memory controller 59, an address multiplexor 60, and a data buffer 61. The memory controller 59 includes means for decoding row address and column address strobes (i.e., RAS and CAS decode). The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by the basic input/output system (BIOS). Further generated by memory controller 36 is a ROM select signal (ROMSEL), that is used to enable or disable ROM 64.

While the microcomputer unit 10 is shown with a basic 1 megabyte RAM module, it is understood that additional memory can be interconnected as represented by the optional memory modules 65 through 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 (hereinafter referred to as NVRAM), a RS232 adapter 76, a parallel adapter 78, a plurality of timers 80, the diskette adapter (or controller) 56, an interrupt controller 84, and the read only memory (ROM) 64. The ROM 64 includes the BIOS (basic input/output system) that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The planar I/O bus 69, as described hereinafter, includes portions defined by conductive pathways formed in interior layers of the multilayer planar, and particularly includes a number of such pathways in a portion extending adjacent an edge of the planar which is positioned to extend adjacent one of the front and rear panels of the chassis. Such design of the planar makes possible the location of a number of I/O connectors along such a side edge for exchange of signals with such devices as the monitor, keyboard and printer.

The clock 72 is used for time of day calculations and the NVRAM is used to store system configuration data. That is, the NVRAM 74 will contain values which describe the present configuration of the system. For example, NVRAM 74 contains information describing the capacity of a fixed disk or diskette, the type of display, the amount of memory, time, date, etc. Of particular importance NVRAM 74 will contain data (which can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

A PCMCIA interface 86 is coupled to the bus 69 for providing an interface and driver for pc cards (in accordance with the PCMCIA standard that may be coupled to the computer system 10 via port 14).

Figure 3:
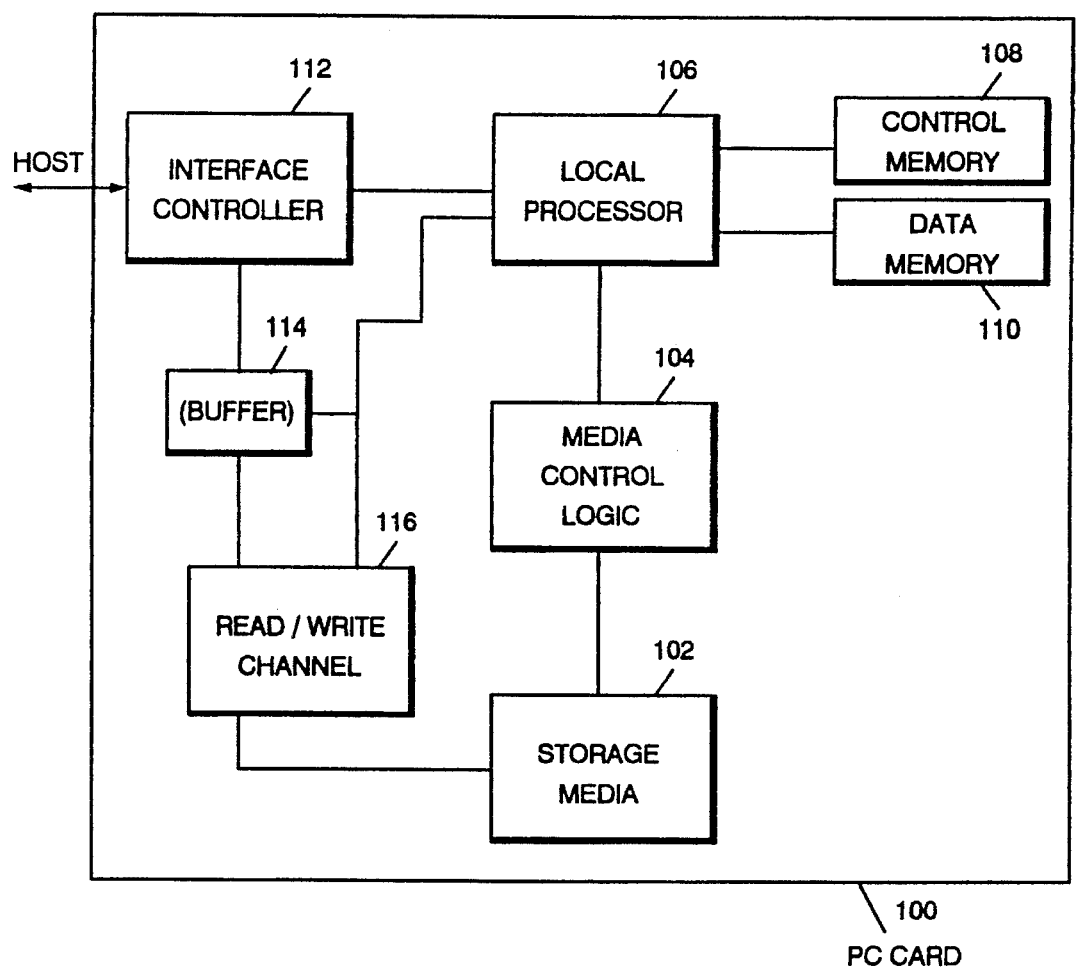
FIG. 3 is a block diagram of an intelligent removable information storage device in accordance with the invention.

Referring to FIG.3, there is shown a simplified block diagram of an intelligent removable information storage device 100 in accordance with the invention. The device 100 comprises a storage medium (or media) 102 for storing information. This storage medium can take the form of an IC memory or a magnetic disk. The device 100 also includes a media control logic circuit 102, and a local processor 106. Thus, the device 100 is an "intelligent" storage device. This intelligence enables storage device 100 to include a password security feature at the device level. Password security at the device level provides an advantage over system-level password security in that a stolen storage device cannot be used in any computer system unless the thief also knows the password. The local processor can be any suitable microprocessor (e.g., a 68HC11 manufactured by Motorola, Inc.). A control memory ROM 108, containing instructions for the local processor, and a data memory RAM 110, containing data for microprocessor operation, are coupled to the processor 106.

An interface controller 112 provides an interface between the device 100 and a host computer (such as computer unit 11 shown in FIGS. 1 and 2). Coupled to the controller 112 is a buffer 114 which provides a cache function for the controller 112. A read/write channel unit 116, coupled to the storage media 102 and to the local processor 106, receives the data pulses from storage media 102 and converts them to usable information. This unit 116 can take the form of a head amplifier in the case where the storage media 102 is a disk drive or any other suitable non-volatile memory such as Flash EEPROM.

A media control ASIC (application-specific integrated circuit) is used to control the storage media 102. In the case where the storage media 102 is a disk drive, block 104 would take the form of a control for a spindle motor. In the case where storage media 102 is an IC memory (e.g., Flash EEPROM), block 104 would take the form of a format reader and could also perform bit parity checks. Along with read/write channel unit 116, the media control logic 104 translates physical media characteristics into logic levels (i.e., it converts magnetic flux changes into a bit stream).

In a preferred embodiment the device 100 is a pc card in accordance with the PCMCIA standard. More specifically, a PCMCIA-ATA card is defined. ATA represents AT-attachable, wherein AT is a trademark of International Business Machines Corporation. PCMCIA devices (other than simple memory cards) communicate with a host computer system via a high level set of commands. For PCMCIA-ATA files, these commands are similar to those employed by more traditional fixed disks. In accordance with the invention, a new ATA and PCMCIA-ATA compatible command called "Password" is defined. For storage devices, the invention is preferably implemented within the file specific command structure in order to maintain compatibility across systems, whether they contain removable files or not. The Password command takes three forms: (1) Password-Enable; (2) Password-Send; and (3) Password-Disable.

Operationally, the owner of a pc card (e.g., card 100) would insert the pc card 100 into the port 14 in the computer 10 (shown in FIG. 1) to use the card 100. If the pc card is not previously in a password protected mode and the owner wishes to make the card 100 password protected, he or she would enter a valid password into the computer unit 10 along with a Password-Enable command. The computer unit 10 would then transfer the password string to the card 100 thus enabling a protection mode in the device 100. This password need not match any previous password, and it does not operate if password protection is already active. To prevent unauthorized access to the storage device 100, it is required that to change a password, a valid password (or passwords, if required) must be transferred to the device 100 in the same atomic (i.e., non-reduceable) operation as the change instruction. This requirement eliminates the "blind" aspect of the password control, and prevents unauthorized users (i.e., those who do not know the password(s)) from modifying passwords or the security status.

Exposure also exists from the time of delivery to the customer until the user enables and sets a password for the first time (i.e, if the user has not yet, or never intends to use the password protection features of the invention). If the card 100 falls into the hands of another person who activates the security feature with a password unknown to the owner, that owner would suffer a fate similar to that of users of the prior art devices. Therefore, according to the invention, a default password can be provided. To enable password protection for the first time, the user inputs this default password to the change instruction.

When a user enters the Password-Send command into the computer 10 it transfers the password string to the device 100. The device 100 compares this string with its recorded string (if password protection been previously invoked) and enables normal operation if the password is valid. This command also sets an error condition if the password is not valid (and password protection has been previously invoked). It does not compare passwords if password security is not enabled. The device 100 will function normally until a reset (soft or hard) is generated. After a reset, this command must be issued again.

When the user wishes to disable the password security feature, he or she enters a Password-Disable into the computer 10, the computer 10 transfers the password string to the device 100. If the password is valid, password protection is disabled. The password is write only from the system 10 to the file 100.

There are two classes of passwords: (1) Write protection (read-only); and (2) Read/Write protection. In the case of write protection passwords, the device 100 is fully operational, with the exception that any write or format operations are disabled. In the read/write protection mode, the device 100 is rendered useless to those without knowledge of the password. Theft of the device would not allow the rightful owner to use the device 100, but the thief is both unable to use the device and to access the data contained therein. The "identify drive" command remains operable so that it may be used to indicate whether password protection is active.

To indicate that card 100 is password protected, a unique string of characters is returned from the card 100 to the computer 10 (within the ID DRIVE information block). This provides a standard method for the computer system 10 to determine whether it must supply a password (via the password command) to continue operation with the storage device.

Host systems that are password aware may look at this data field prior to attempting access, and determine whether the password is required to be issued to the drive. Preferably, this issuance will be accomplished via system prompt of the user.

In a preferred embodiment, the password and a password enabling flag are stored in the media 102 itself, along with the protected data, rather than with the control electronics. This provides an increased level of security because a sophisticated thief would be prevented from replacing the control electronics on the target device with those of a similar but unprotected device (or one with a known password). In other words, if the password is part of the electronics instead of the media, the electronics can be switched to gain access to the media. The electronics and the media are easy to separate as a result of the manufacturing process.

The controller firmware does not allow user access to the password storage area of the media. Design verification testing should provide assurance that the user commands range check their parameters to prevent unintended access to this area (such as a negative array subscript).

In order to deal with cases where the owner of the pc card 100 loses the password a "backup" password may be assigned at the time of manufacture. This "override" password would be indexed according to the device serial number and list maintained by the manufacturer. This password would be printed in the written materials that come with the device, and instructions would include advice that the password be stored securely if the password is lost the owner would need only check these materials.

What is claimed is:

1. An information storage system, for use in a computer or other information processing system, said information storage system comprising:

an information storage device for storing information including a read-only password and a read/write password;

said storage system having selectable read-only and read/write password protected modes of operation;

when said read-only mode is selected, said storage system being unlocked to permit read-only access to said storage device in response to a match between an incoming password and a read-only password stored in said storage device; and when said read/write mode is selected, said storage system being unlocked to permit read/write access to said storage device in response to a match between an incoming password and a read/write password stored in said storage device;

whereby, when one or more of said password protected modes have been selected, and in the event the information storage system is removed from the information processing system, access to the storage device will be locked until a password is sent to said storage system that matches one of said read-only or read/write passwords stored in said storage device.

2. The information storage system of claim 1, further comprising means for programming, the read-only and read/write passwords stored in said storage device.

3. The information storage system of claim 1, further comprising a selectable unprotected mode of operation wherein access to said storage device is not password protected when said unprotected mode is selected.

4. The information storage system of claim 1, further comprising:

a selectable unprotected mode of operation wherein access to said storage device is not password protected when said unprotected mode is selected; and means for disabling said read-only and read/write passwords, such that said unprotected mode is selected in response to both read-only and read/write passwords being disabled.

5. The information storage system of claim 1, further comprising a backup password, wherein access to said storage device is enabled in response to a match between a received password and said backup password.

6. A computer or other information processing system comprising a processor, a memory, a data input device, a data output device, and an information storage system for storing information including a read-only password and a read/write password, said information storage system further comprising:

read-only and read/write password protected modes of operation; wherein said storage system is unlocked in said read-only mode to permit read-only access to the information stored in said storage system in response to a match between an incoming password and a read-only password stored in said storage system; and wherein said storage system is unlocked in said read/write mode to permit read/write access to said storage system in response to a match between an incomimg password and a read/write password stored in said storage system; whereby, when one or more of said password protected modes have been selected and when said storage system has been removed from said computer or other information processing system, access to the storage system is locked until a password is sent to said storage system that matches one of said read-only or read/write passwords stored in said storage system.

7. The computer or other information processing system of claim 6, further comprising means for programming the read-only and read/write passwords stored in said storage system.

8. The computer or other information processing system of claim 6, further comprising a selectable unprotected mode of operation wherein access to said storage system is not password protected when said unprotected mode is selected.

9. The computer or other information processing system of claim 6, further comprising:

a selectable unprotected mode of operation wherein access to said storage system is not password protected when said unprotected mode is selected; and means for disabling said read-only and read/write passwords, such that said unprotected mode is selected in response to both read-only and read/write passwords being disabled.

10. The computer or other information processing system of claim 6, further comprising a backup password, wherein access to said storage system is enabled in response to a match between a received password and said backup password.

* * * * *